(12) United States Patent
Yang

(10) Patent No.: US 11,305,749 B2
(45) Date of Patent: Apr. 19, 2022

(54) REAR WHEEL STEERING CONTROL METHOD AND SYSTEM FOR CARGO TRAILER

(71) Applicants: Hyundai Motor Company, Seoul (KR); KIA Motors Corporation, Seoul (KR)

(72) Inventor: Young Dug Yang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 138 days.

(21) Appl. No.: 16/838,166

(22) Filed: Apr. 2, 2020

(65) Prior Publication Data

US 2021/0179059 A1    Jun. 17, 2021

(30) Foreign Application Priority Data

Dec. 16, 2019   (KR) .................. 10-2019-0167888

(51) Int. Cl.
*B60W 10/20* (2006.01)
*B60W 30/182* (2020.01)

(52) U.S. Cl.
CPC .......... *B60W 10/20* (2013.01); *B60W 30/182* (2013.01); *B60W 2300/14* (2013.01); *B60W 2520/10* (2013.01); *B60W 2520/22* (2013.01); *B60W 2540/18* (2013.01); *B60W 2554/802* (2020.02); *B60W 2710/20* (2013.01)

(58) Field of Classification Search
CPC ............... B60W 10/20; B60W 30/182; B60W 2710/20; B60W 2554/802; B60W 2300/14; B60W 2520/22; B60W 2540/18; B60W 2520/10; B60W 30/045; B60W 2710/207; B60W 2300/145; B60W 2050/0001;

(Continued)

(56) References Cited

U.S. PATENT DOCUMENTS 4,982,976 A * 1/1991 Kramer ............... B62D 13/005
                                                              280/426
7,338,335 B1 * 3/2008 Messano ............. B62D 35/001
                                                              180/65.22

(Continued)

FOREIGN PATENT DOCUMENTS

CN    107336759 A  * 11/2017
JP    2019059393 A  *  4/2019  ............ B60W 30/00

(Continued)

OTHER PUBLICATIONS

KR-20090019241-A Translation (Year: 2009).*

(Continued)

*Primary Examiner* — Jeff A Burke
*Assistant Examiner* — Kyle T Johnson
(74) *Attorney, Agent, or Firm* — McDonnell Boehnen Hulbert & Berghoff LLP

(57) ABSTRACT

The present disclosure provides a rear wheel steering (RWS) control method and system for a cargo trailer. The RWS control method may include determining a driving mode of a vehicle connected to the cargo trailer, executing an RWS control logic of the cargo trailer based on the driving mode and an input signal from the vehicle corresponding to the driving mode, and performing RWS control for the cargo trailer based on the RWS control logic.

20 Claims, 10 Drawing Sheets

(58) Field of Classification Search
CPC .. B60W 40/105; B62D 6/00; B60Y 2300/182; B60Y 2300/045; B60Y 2200/148; B60Y 2300/28
See application file for complete search history.

(56) References Cited

U.S. PATENT DOCUMENTS

| | | | | |
|---|---|---|---|---|
| 2005/0206233 | A1* | 9/2005 | Offerle | B60W 10/18 303/146 |
| 2006/0235589 | A1* | 10/2006 | Deng | B62D 13/00 701/41 |
| 2014/0188344 | A1* | 7/2014 | Lavoie | B62D 15/028 701/41 |
| 2014/0277942 | A1* | 9/2014 | Kyrtsos | B60W 10/18 701/41 |
| 2014/0343793 | A1* | 11/2014 | Lavoie | B60W 10/18 701/41 |
| 2016/0318493 | A1* | 11/2016 | Drako | B60T 8/1708 |
| 2018/0251123 | A1* | 9/2018 | Sigmar | B60W 20/00 |
| 2018/0304944 | A1* | 10/2018 | Wright | B62D 15/021 |
| 2019/0009815 | A1* | 1/2019 | Lavoie | B60W 40/114 |
| 2019/0031238 | A1* | 1/2019 | Kim | B62D 7/159 |
| 2021/0179059 | A1* | 6/2021 | Yang | B60W 10/20 |

FOREIGN PATENT DOCUMENTS

| | | | | |
|---|---|---|---|---|
| KR | 20090019241 | A * | 2/2009 | ........... B62D 53/005 |
| KR | 20090047578 | A * | 5/2009 | |
| KR | 101208328 | B1 | 12/2012 | |
| KR | 20180053885 | A * | 5/2018 | |
| KR | 20180062189 | A | 6/2018 | |
| KR | 101937596 | B1 | 1/2019 | |
| KR | 20190012488 | A | 2/2019 | |
| WO | WO-2018039592 | A1 * | 3/2018 | ........... B62D 53/005 |

OTHER PUBLICATIONS

KR-20090047578-A Translation (Year: 2009).*
CN-107336759-A (Year: 2017).*
KR-20180053885-A (Year: 2018).*
JP-2019059393-A Translation (Year: 2019).*

* cited by examiner

US 11,305,749 B2

REAR WHEEL STEERING CONTROL METHOD AND SYSTEM FOR CARGO TRAILER

CROSS-REFERENCE TO RELATED APPLICATIONS

This application claims the benefit of Korean Patent Application No. 10-2019-0167888, filed on Dec. 16, 2019, which is hereby incorporated by reference as if fully set forth herein.

FIELD

The present disclosure relates to a rear wheel steering (RWS) control method and system for a cargo trailer.

BACKGROUND

In general, a tow vehicle and a cargo trailer towed by the tow vehicle are, respectively, provided with a coupler mounted to the rear side of the tow vehicle and a tow bar mounted to the front side of the cargo trailer so as to be engaged with the coupler. The cargo trailer is towed by the tow vehicle while rotating about the coupler.

When the tow vehicle to which the cargo trailer is connected travels, particularly, turns, the minimum turning radius increases and driving agility and steering stability are deteriorated due to the distance between the tow vehicle and the cargo trailer.

In particular, since the tow vehicle and the cargo trailer are connected to each other via a coupler, during reverse turning thereof, the direction in which the tow vehicle is turned and the direction in which the cargo trailer is turned are opposite each other. Therefore, it is very difficult for the driver to turn the tow vehicle and the cargo trailer while reversing the same.

SUMMARY

Accordingly, the present disclosure is directed to a rear wheel steering (RWS) control method and system for a cargo trailer that substantially obviate one or more problems due to limitations and disadvantages of the related art.

An object of the present disclosure is to provide a RWS control method and system for a cargo trailer for controlling a RWS device that is installed to the cargo trailer in place of a conventional axle-wheel structure.

However, the objects to be accomplished by the disclosure are not limited to the above-mentioned object, and other objects not mentioned herein will be clearly understood by those skilled in the art from the following description.

In order to accomplish the above and other objects, a RWS control method for a cargo trailer according to an embodiment of the present disclosure may include determining a driving mode of a vehicle connected to the cargo trailer, executing a RWS control logic of the cargo trailer based on the driving mode and an input signal from the vehicle corresponding to the driving mode, and performing RWS control for the cargo trailer based on the RWS control logic.

According to an embodiment, the determining a driving mode of a vehicle may include determining, based on the input signal, one of a low-speed forward turning mode, a high-speed forward turning mode, and a reverse turning mode of the vehicle.

According to an embodiment, the executing a RWS control logic of the cargo trailer may include controlling a RWS angle of the cargo trailer based on a steering angle of the vehicle, and performing in-phase control or reverse-phase control on a wheel of the cargo trailer based on the RWS angle.

According to an embodiment, the controlling a RWS angle of the cargo trailer based on a steering angle of the vehicle may include, when the absolute value of the product of the length of a tow bar and the cosine of the angle between the tow bar and a connecting shaft exceeds the absolute value of the product of the length of a coupler and the cosine of the angle between the coupler and the connecting shaft, reducing the RWS angle of the cargo trailer.

According to an embodiment, the controlling a RWS angle of the cargo trailer based on a steering angle of the vehicle may include, when the vehicle is in the low-speed forward turning mode or in the high-speed forward turning mode, controlling the RWS angle of the cargo trailer based on the travel time difference due to the distance between the vehicle and the cargo trailer according to the vehicle speed, the length of the coupler, the length of the tow bar, the angle between the coupler and the connecting shaft, and the angle between the tow bar and the connecting shaft.

According to an embodiment, the performing in-phase control or reverse-phase control on a wheel of the cargo trailer may include, when the vehicle is in the low-speed forward turning mode, performing reverse-phase correction control on the wheel of the cargo trailer based on the controlled RWS angle in the direction opposite the direction in which the vehicle is turned.

According to an embodiment, the performing in-phase control or reverse-phase control on a wheel of the cargo trailer may include, when the vehicle is in the high-speed forward turning mode, performing in-phase correction control on the wheel of the cargo trailer based on the controlled RWS angle in the same direction as the direction in which the vehicle is turned.

According to an embodiment, the controlling a RWS angle of the cargo trailer based on a steering angle of the vehicle may include, when the vehicle is in the reverse turning mode, calculating the extent of alignment between the vehicle and the cargo trailer based on the length of the coupler, the length of the tow bar, the angle between the coupler and the connecting shaft, and the angle between the tow bar and the connecting shaft.

According to an embodiment, the RWS control method may further include correcting, based on the extent of alignment, an amount by which the cargo trailer is turned about the connecting shaft in the direction opposite the direction in which the vehicle is turned.

According to an embodiment, the RWS control method may further include, upon sudden steering of the vehicle, performing control such that a pinion angle generated by the steering wheel of the vehicle increases.

In order to accomplish the above and other objects, a RWS control system for a cargo trailer according to an embodiment of the present disclosure may include a RWS controller configured to determine the driving mode of a vehicle connected to the cargo trailer and execute a RWS control logic of the cargo trailer based on the driving mode and an input signal from the vehicle corresponding to the driving mode, and a RWS device configured to perform RWS control for the cargo trailer based on the RWS control logic.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, devices and methods to which embodiments of the present disclosure are applied will be described in detail with reference to the accompanying drawings. The suffixes "module" and "unit" used herein to describe configuration components are assigned or used in consideration only of convenience in creating this specification, and the two suffixes themselves do not have any distinguished meanings or roles from each other.

In the following description of the embodiments, it will be understood that, when each element is referred to as being formed "on" or "under" and "ahead of" or "behind" another element, it can be directly "on" or "under" and "ahead of" or "behind" the other element, or can be indirectly formed with one or more intervening elements therebetween.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

Additionally, the term "comprises", "includes", or "has" described herein should be interpreted not to exclude other elements but to further include such other elements since the corresponding elements may be inherent unless mentioned otherwise. Unless otherwise defined, all terms used herein, which include technical or scientific terms, have the same meanings as those generally appreciated by those skilled in the art. Terms such as those defined in common dictionaries should be interpreted as having the same meanings as terms in the context of the pertinent technology, and should not be interpreted as having ideal or excessively formal meanings unless clearly defined in the specification.

Figure 1:
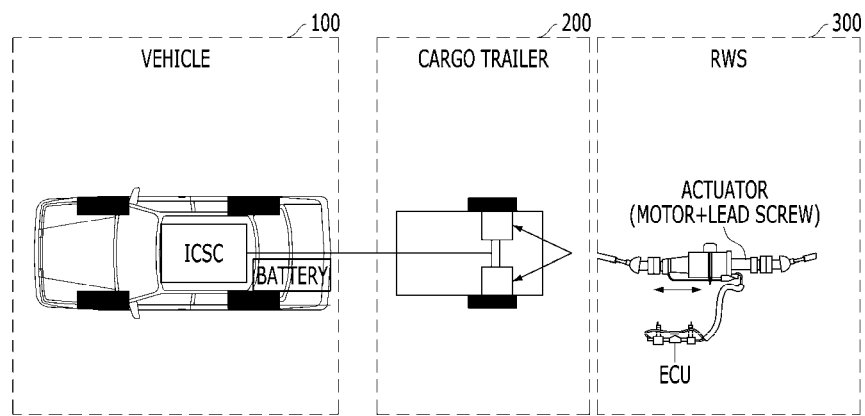
FIG. 1 is a diagram showing a vehicle and a cargo trailer according to an embodiment of the present disclosure.
Figure 2:
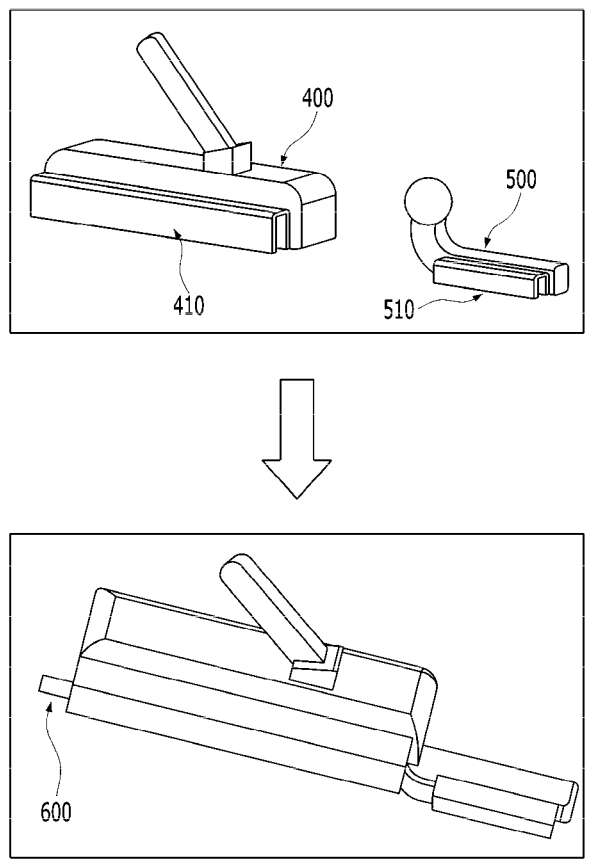
FIG. 2 is a diagram showing a coupler and a tow bar for connecting the vehicle and the cargo trailer shown in FIG. 1 to each other.

FIG. 1 is a diagram showing a vehicle and a cargo trailer according to an embodiment of the present disclosure, and FIG. 2 is a diagram showing a coupler and a tow bar for connecting the vehicle and the cargo trailer shown in FIG. 1 to each other.

Referring to FIG. 1, the vehicle 100 may be a tow vehicle configured to tow the cargo trailer 200. In this case, the vehicle 100 may be a hybrid/electric/hydrogen vehicle capable of supplying electric power to an actuator of the cargo trailer 200. Therefore, the vehicle 100 may include a battery, and may be configured to charge the battery for driving of a motor thereof.

In addition, the vehicle 100 may include an integrated chassis & safety control (ICSC) system. The ICSC system may include an electronic stability control (ESC) system, a continuous damping control (CDC) system, an active cruise control (ACC) system, an electro hydraulic power steering (EHPS) system, an electronic parking brake (EPB) system, an active control retractor (ACR), an active front steering (AFS) system, and the like.

The ICSC system has mechanisms that independently operate so as to exhibit inherent functions thereof, thereby achieving the driving performance and the safety performance desired by the driver.

The cargo trailer 200 may include a rear wheel steering (RWS) device 300, rather than a conventional axle-wheel structure. The RWS device 300 may include a motor, a lead screw, and an electronic control unit (ECU).

The RWS device 300 may variably control the wheel steering angle of the cargo trailer 200. When controlling the wheel steering angle of the cargo trailer 200, the RWS device 300 may determine a speed of the cargo trailer 200 of 60 km/h or less to be a low speed and may determine a speed of the cargo trailer 200 above 60 km/h to be a high speed. During low-speed turning of the vehicle, the RWS device 300 may perform front wheel/rear wheel reverse-phase control so as to reduce the minimum turning radius and enhance driving agility. During high-speed turning of the vehicle, the RWS device 300 may perform front wheel/rear wheel in-phase control so as to improve driving stability.

The vehicle 100 may include a coupler 400, and the cargo trailer 200 may include a tow bar 500. The vehicle 100 and the cargo trailer 200 may be connected to each other via the coupler 400 and the tow bar 500.

As shown in FIG. 2, the coupler 400 may include a cable connected to the ICSC system, and the tow bar 500 may include a cable connected to the cargo trailer 200. The cable may include a cable for communication with the vehicle 100 and a battery connection cable.

In this case, the coupler 400 and the tow bar 500 may include a cable insertion holder 410 and a cable insertion holder 510, respectively, into each of which the cable is inserted. Thus, when the coupler 400 and the tow bar 500 are connected to each other, the cable 600 disposed in the cable insertion holder 410 of the coupler 400 and the cable 600 disposed in the cable insertion holder 510 of the tow bar 500 may be connected to each other. Through this connection of the cables, the cargo trailer 200 may receive a driving signal and a RWS control signal from the vehicle 100. In addition, the cargo trailer 200 may include a battery. The battery of the cargo trailer 200 may supply electricity for driving a motor disposed in the RWS device 300.

Figure 3:
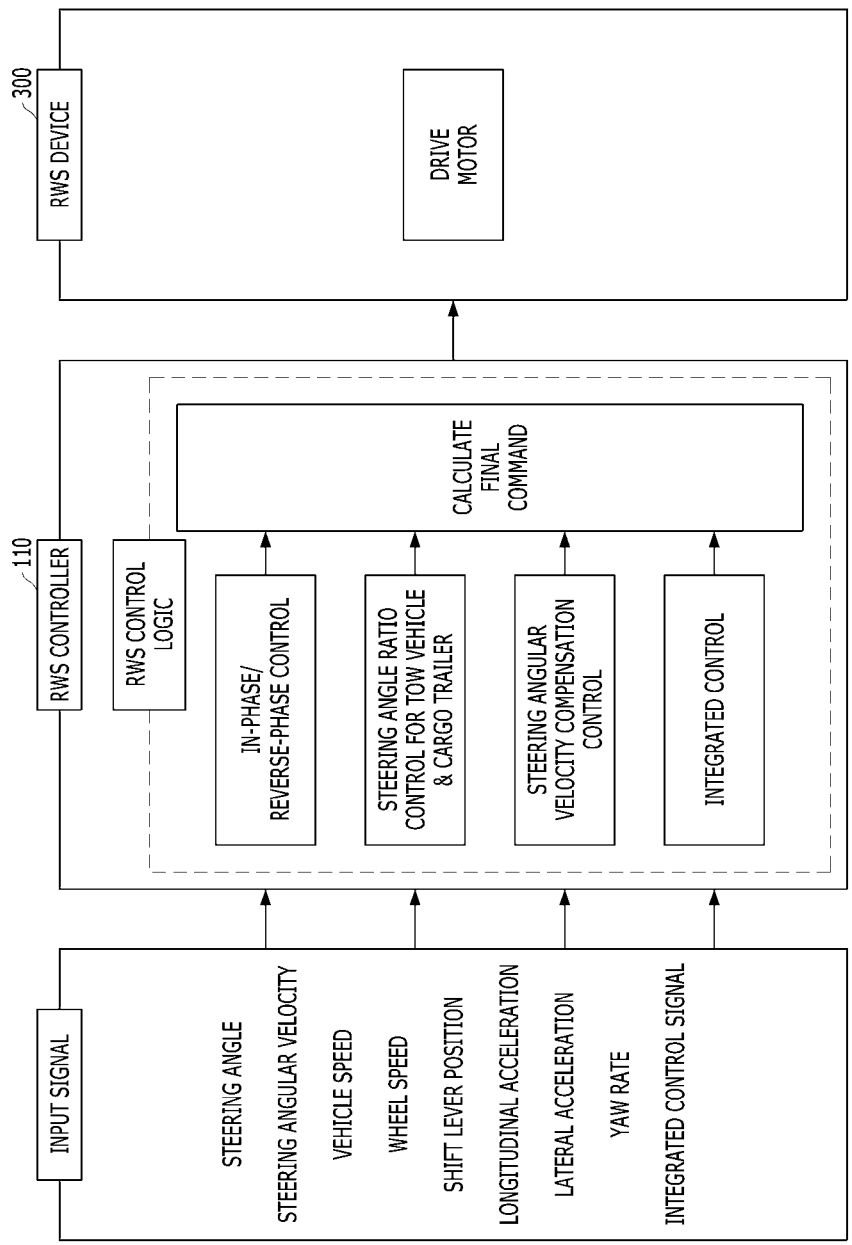
FIG. 3 is a block diagram showing the configuration of a rear wheel steering (RWS) control system for the cargo trailer according to an embodiment of the present disclosure.

FIG. 3 is a block diagram showing the configuration of a RWS control system for the cargo trailer according to an embodiment of the present disclosure.

Referring to FIG. 3, the RWS control system for the cargo trailer may include a RWS controller 110 and the RWS device 300.

The RWS controller 110 may be disposed in the vehicle 100 in order to control the RWS of the cargo trailer 200 based on an input signal from the vehicle 100. The input signal from the vehicle 100 may include a steering angle, a steering angular velocity, a vehicle speed, a wheel speed, a shift lever position, a longitudinal acceleration, a lateral acceleration, a yaw rate, an integrated control signal, and the like.

The RWS controller 110 may execute a cargo trailer RWS control logic based on the input signal mentioned above.

The cargo trailer RWS control logic may include a wheel in-phase/reverse-phase control logic for the cargo trailer 200, a steering angle ratio control logic for the vehicle 100 and the cargo trailer 200, a steering angular velocity compensation control logic, and an integrated control logic.

The RWS controller 110 may perform in-phase/reverse-phase control based on the input signal. According to an embodiment, the RWS controller 110 may perform in-phase/reverse-phase control on the wheel of the cargo trailer 200 according to the vehicle speed so as to reduce a side slip angle.

The RWS controller 110 may control the steering angle ratio of the vehicle 100 and the cargo trailer 200. According to an embodiment, the RWS controller 110 may reduce the in-phase control at the beginning of steering so as to improve the yaw behavior responsiveness of the vehicle.

The RWS controller 110 may perform compensation control on the steering angular velocity. According to an embodiment, the RWS controller 110 may improve the yaw behavior responsiveness of the vehicle upon sudden steering by the driver.

That is, upon sudden steering, the RWS controller 110 may perform control so as to increase a pinion angle according to the operation of the steering wheel, thereby improving system responsiveness and enhancing the responsiveness of the vehicle in the lateral direction. The RWS controller 110 may implement integrated control to perform an integrated chassis & safety control overlay function.

The RWS controller 110 may calculate a final command based on in-phase/reverse-phase control, control for the steering angle ratio of the vehicle 100 and the cargo trailer 200, compensation control for the steering angular velocity, and integrated control.

The RWS controller 110 may provide the final command to the RWS device 300 through the cable.

The RWS device 300 may drive the motor in response to the final command from the RWS controller 110 to change the steering angle of the cargo trailer 200.

Figure 4:
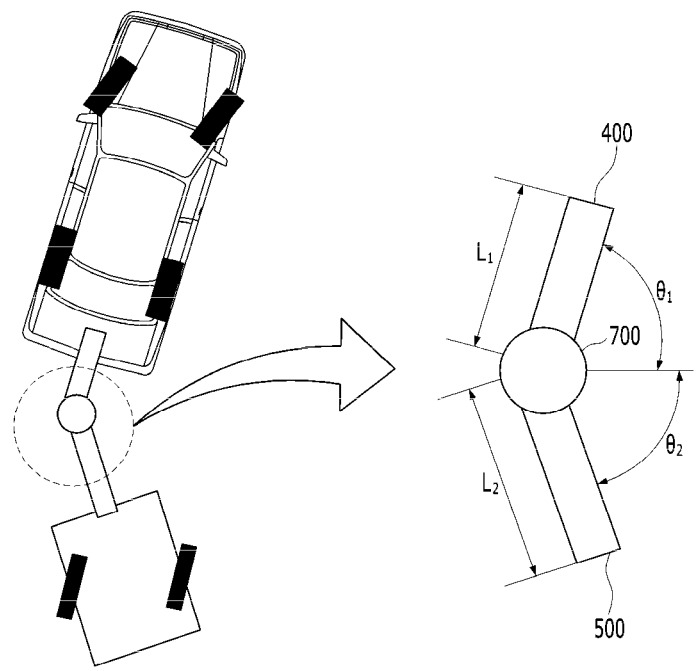
FIG. 4 is a diagram showing a connecting shaft between the vehicle and the cargo trailer according to an embodiment of the present disclosure.

FIG. 4 is a diagram showing a connecting shaft between the vehicle and the cargo trailer according to an embodiment of the present disclosure.

Referring to FIG. 4, when the vehicle 100 and the cargo trailer 200 are connected to each other, a connecting shaft 700 may be provided at the coupling portion between the coupler 400 and the tow bar 500. In this case, the distance between the vehicle 100 and the connecting shaft 700 may correspond to the length L1 of the coupler 400, and the distance between the cargo trailer 200 and the connecting shaft 700 may correspond to the length L2 of the tow bar 500. The length L1 of the coupler 400 and the length L2 of the tow bar 500 may have preset values according to the types of the coupler 400 and the tow bar 500.

Meanwhile, when the vehicle 100 and the cargo trailer 200 are connected and driven, the connection angle between the coupler 400 and the tow bar 500 may change according to the movement of the vehicle 100. Therefore, the angle θ1 formed between the coupler 400 and the connecting shaft 700 and the angle θ2 formed between the tow bar 500 and the connecting shaft 700 may change according to the movement of the vehicle 100.

Figure 5:
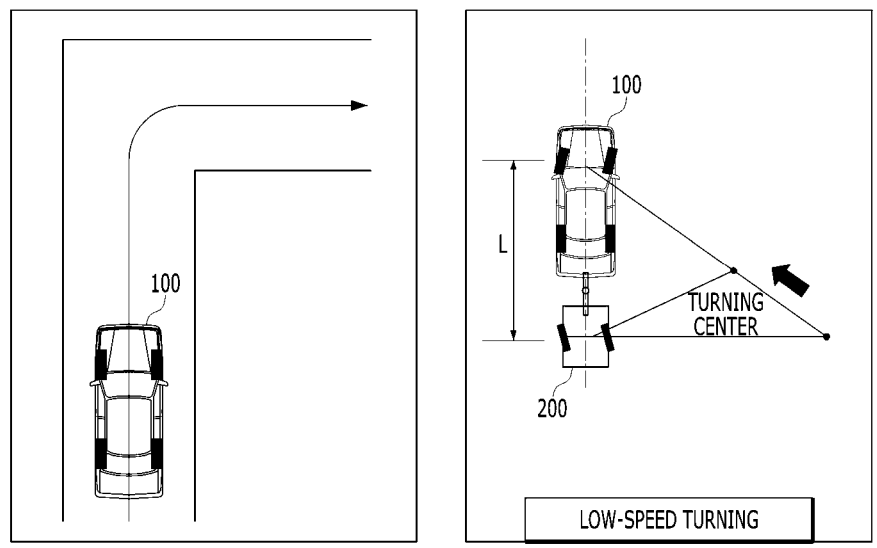
FIG. 5 is a diagram showing the operation of a RWS device of the cargo trailer upon low-speed turning of the vehicle according to an embodiment of the present disclosure.

FIG. 5 is a diagram showing the operation of the RWS device of the cargo trailer upon low-speed turning of the vehicle according to an embodiment of the present disclosure.

Referring to FIG. 5, when the vehicle 100 travels around a right corner, the vehicle 100 turns right at a low speed. In this case, the RWS controller 110 may control the RWS angle of the cargo trailer 200 in consideration of the travel time difference due to the distance L between the vehicle 100 and the cargo trailer 200 according to the vehicle speed, the length L1 of the coupler 400, the length L2 of the tow bar 500, the angle θ1 formed between the coupler 400 and the connecting shaft 700, and the angle θ2 formed between the tow bar 500 and the connecting shaft 700.

To this end, the RWS controller 110 may calculate the travel time difference T according to the vehicle speed based on the distance L from the front wheel of the vehicle 100 to the wheel of the cargo trailer 200. The travel time difference T may be a value obtained by dividing the distance L from the front wheel of the vehicle 100 to the wheel of the cargo trailer 200 by the vehicle speed V. Upon low-speed turning of the vehicle, when the absolute value of the product of the length L2 of the tow bar 500 and the cosine COS θ2 of the angle θ2 between the tow bar 500 and the connecting shaft 700 exceeds the absolute value of the product of the length L1 of the coupler 400 and the cosine COS θ1 of the angle θ1 between the coupler 400 and the connecting shaft 700, the RWS controller 110 may reduce the RWS angle of the cargo trailer 200.

Through this operation, the RWS controller 110 may perform reverse-phase correction on the wheel of the cargo trailer 200. According to an embodiment, when the front wheel of the vehicle 100 is steered to the right so that the vehicle 100 travels around the right corner, the wheel of the cargo trailer 200 may be steered to the left.

Through this operation, the turning center of the vehicle 100 and the cargo trailer 200 may move to be closer to the vehicle 100 and the cargo trailer 200 than the turning center thereof before the reverse-phase correction for the wheel of the cargo trailer 200, and the turning radius of the vehicle 100 and the cargo trailer 200 may be reduced. Accordingly, the vehicle 100 and the cargo trailer 200 may obtain improved agility upon low-speed travel.

Figure 6:
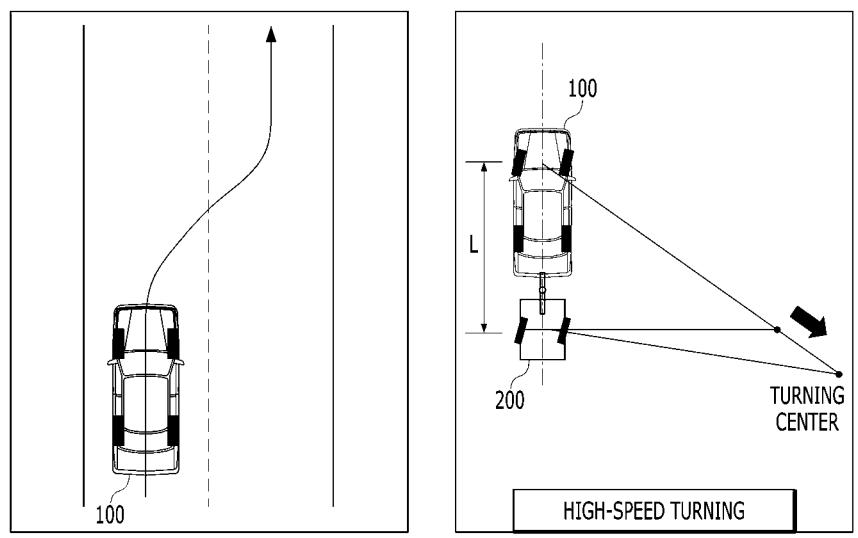
FIG. 6 is a diagram showing the operation of the RWS device of the cargo trailer upon high-speed turning of the vehicle according to an embodiment of the present disclosure.

FIG. 6 is a diagram showing the operation of the RWS device of the cargo trailer upon high-speed turning of the vehicle according to an embodiment of the present disclosure.

Referring to FIG. 6, the vehicle 100 may change lanes while traveling at a high speed. In this case, the RWS controller 110 may control the RWS angle of the cargo trailer 200 in consideration of the travel time difference due to the distance L between the vehicle 100 and the cargo trailer 200 according to the vehicle speed, the length L1 of the coupler 400, the length L2 of the tow bar 500, the angle θ1 formed between the coupler 400 and the connecting shaft 700, and the angle θ2 formed between the tow bar 500 and the connecting shaft 700.

Upon high-speed turning of the vehicle, when the absolute value of the product of the length L2 of the tow bar 500 and the cosine COS θ2 of the angle θ2 between the tow bar 500 and the connecting shaft 700 exceeds the absolute value of the product of the length L1 of the coupler 400 and the cosine COS θ1 of the angle θ1 between the coupler 400 and the connecting shaft 700, the RWS controller 110 may reduce the RWS angle of the cargo trailer 200.

Through this operation, the RWS controller 110 may perform in-phase control on the wheel of the cargo trailer 200. According to an embodiment, when the front wheel of the vehicle 100 is steered to the right so that the vehicle 100 changes lanes to the right lane, the wheel of the cargo trailer 200 may be steered to the right.

Through this operation, the turning center of the vehicle 100 and the cargo trailer 200 may move further away from the vehicle 100 and the cargo trailer 200 than the turning center thereof before the steering control for the wheel of the cargo trailer 200, and the turning radius of the vehicle 100 and the cargo trailer 200 may be increased. Accordingly, the vehicle 100 and the cargo trailer 200 may obtain improved driving stability upon high-speed travel.

Figure 7:
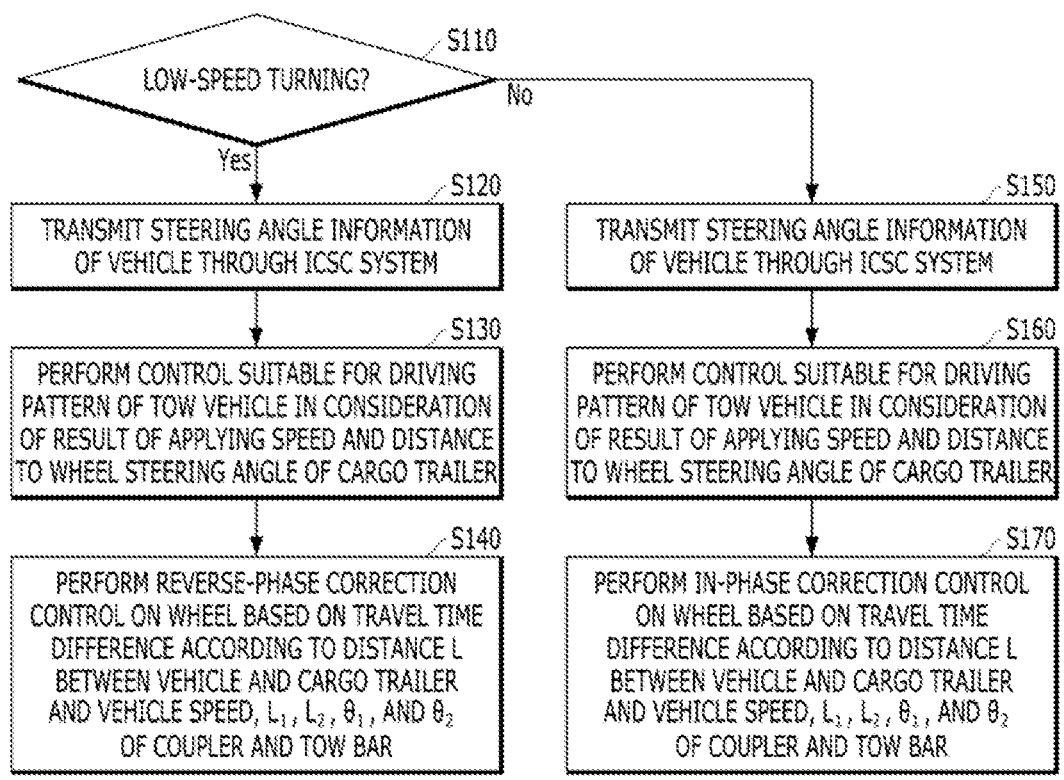
FIG. 7 is a diagram showing a RWS control method for the cargo trailer upon low-speed turning of the vehicle and high-speed turning of the vehicle according to an embodiment of the present disclosure.

FIG. 7 is a diagram showing a RWS control method for the cargo trailer upon low-speed turning of the vehicle and high-speed turning of the vehicle according to an embodiment of the present disclosure.

Referring to FIG. 7, the RWS controller 110 may determine whether the vehicle 100 is turning at a low speed or at a high speed based on an input signal received from the vehicle 100 (S110). In this case, when the speed of the vehicle 100 is 60 km/h or higher, the RWS controller 110 may determine that the vehicle 100 is turning at a high speed, and when the speed of the vehicle 100 is lower than 60 km/h, the RWS controller 110 may determine that the vehicle 100 is turning at a low speed.

After step S110, when the vehicle 100 is turning at a low speed (Yes in step S110), steering angle information of the vehicle may be transmitted to the RWS controller 110 through the ICSC system of the vehicle 100 (S120).

After step S120, the RWS controller 110 may perform control suitable for the driving pattern of the vehicle in consideration of the result of applying the speed and the distance to the wheel steering angle of the cargo trailer (S130).

After step S130, the RWS controller 110 may perform reverse-phase correction control on the wheel of the cargo trailer 200 based on the travel time difference due to the distance L between the vehicle 100 and the cargo trailer 200 according to the vehicle speed, the length L1 of the coupler 400, the length L2 of the tow bar 500, the angle θ1 formed between the coupler 400 and the connecting shaft 700, and the angle θ2 formed between the tow bar 500 and the connecting shaft 700 (S140).

Meanwhile, after step S110, when the vehicle 100 is turning at a high speed (No in step S110), steering angle information of the vehicle may be transmitted to the RWS controller 110 through the ICSC system of the vehicle 100 (S150).

After step S150, the RWS controller 110 may perform control suitable for the driving pattern of the vehicle in consideration of the result of applying the speed and the distance to the wheel steering angle of the cargo trailer (S160).

After step S160, the RWS controller 110 may perform in-phase correction control on the wheel of the cargo trailer 200 based on the travel time difference due to the distance L between the vehicle 100 and the cargo trailer 200 according to the vehicle speed, the length L1 of the coupler 400, the length L2 of the tow bar 500, the angle θ1 formed between the coupler 400 and the connecting shaft 700, and the angle θ2 formed between the tow bar 500 and the connecting shaft 700 (S170).

Figure 8:
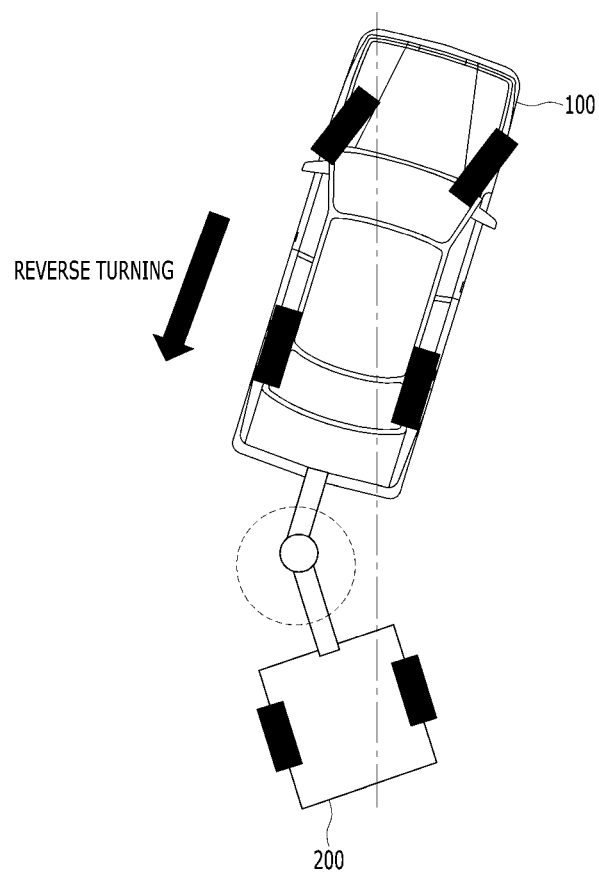
FIG. 8 is a diagram showing the operation of a cargo trailer having no RWS device upon reverse turning of the vehicle.

FIG. 8 is a diagram showing the operation of a cargo trailer having no RWS device upon reverse turning of the vehicle.

Referring to FIG. 8, when the vehicle 100 is turned while being reversed, the cargo trailer 200 having no RWS device is turned about the connecting shaft in the direction opposite the direction in which the vehicle 100 is turned. Therefore, upon reverse turning of the vehicle, it is difficult for the driver to control the movement of the cargo trailer 200 in the direction desired by the driver.

Figure 9:
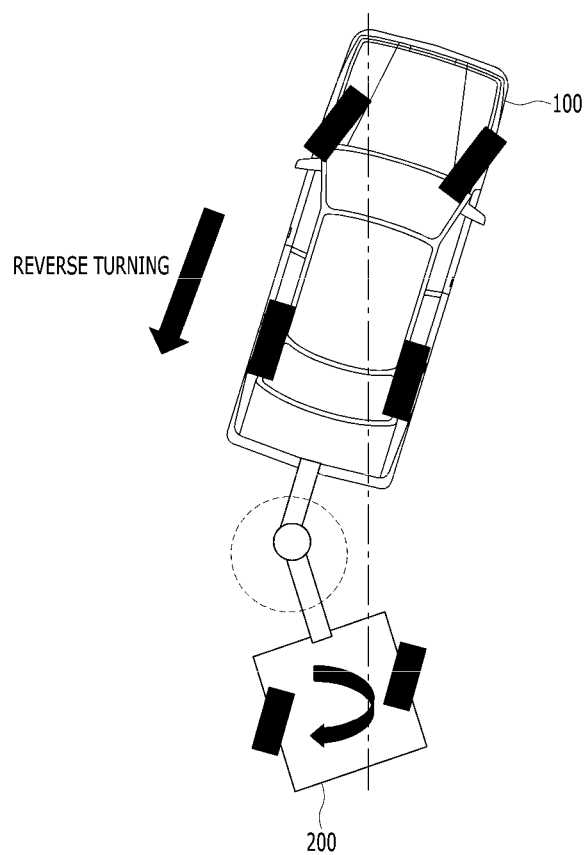
FIG. 9 is a diagram showing the operation of the RWS device of the cargo trailer upon reverse turning of the vehicle according to an embodiment of the present disclosure.

FIG. 9 is a diagram showing the operation of the RWS device of the cargo trailer upon reverse turning of the vehicle according to an embodiment of the present disclosure.

Referring to FIG. 9, when the vehicle 100 is turned while being reversed, the RWS controller 110 may calculate the extent of alignment between the vehicle 100 and the cargo trailer 200 in consideration of the length L1 of the coupler 400, the length L2 of the tow bar 500, the angle θ1 formed between the coupler 400 and the connecting shaft 700, and the angle θ2 formed between the tow bar 500 and the connecting shaft 700.

Upon reverse turning of the vehicle, when the absolute value of the product of the length L2 of the tow bar 500 and the cosine COS θ2 of the angle θ2 between the tow bar 500 and the connecting shaft 700 exceeds the absolute value of the product of the length L1 of the coupler 400 and the cosine COS θ1 of the angle θ1 between the coupler 400 and the connecting shaft 700, the RWS controller 110 may reduce the RWS angle of the cargo trailer 200.

Through this operation, upon reverse turning of the vehicle, the RWS controller 110 corrects the position of the cargo trailer 200 by adjusting the RWS angle of the cargo trailer 200 by an amount equivalent to the angle to which the cargo trailer 200 is turned about the connecting shaft 700 in the direction opposite the direction in which the vehicle 100 is turned.

Therefore, the RWS controller 110 may correct the distance that the cargo trailer 200 moves in a direction different from the direction desired by the driver. Upon reverse turning of the vehicle, the criterion on the basis of which the RWS controller 110 determines the amount of RWS correction may be a position setting line provided at a place to which the driver desires to drive the vehicle.

According to an embodiment, upon reverse parking of the vehicle, the RWS controller 110 may set a parking line of a parking area in which the driver desires to park the vehicle as the position setting line, and may determine the amount of RWS correction on the basis of the parking line.

Figure 10:
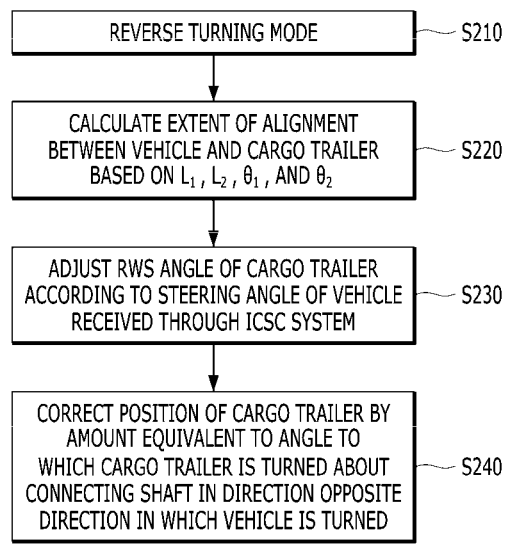
FIG. 10 is a diagram showing a RWS control method for the cargo trailer upon reverse turning of the vehicle according to an embodiment of the present disclosure.

FIG. 10 is a diagram showing a RWS control method for the cargo trailer upon reverse turning of the vehicle according to an embodiment of the present disclosure.

Referring to FIG. 10, the RWS controller 110 may determine whether the vehicle 100 is in a reverse turning mode based on an input signal received from the vehicle 100 (S210).

After step S210, when the vehicle 100 is in the reverse turning mode, the RWS controller 110 may calculate the extent of alignment between the vehicle 100 and the cargo trailer 200 based on the length L1 of the coupler 400, the length L2 of the tow bar 500, the angle θ1 formed between the coupler 400 and the connecting shaft 700, and the angle θ2 formed between the tow bar 500 and the connecting shaft 700 (S220).

After step S220, the RWS controller 110 may control the RWS angle of the cargo trailer 200 according to the steering angle of the vehicle received through the ICSC system (S230).

After step S230, the RWS device 300 of the cargo trailer 200 may correct the position of the cargo trailer 200 by an amount equivalent to the angle to which the cargo trailer 200 is turned about the connecting shaft 700 in the direction opposite the direction in which the vehicle 100 is turned (S240).

As is apparent from the above description, the present disclosure provides a RWS control method and system for a cargo trailer for controlling the wheel steering angle of a cargo trailer, thereby improving the steerability and reverse turning performance of a tow vehicle and a cargo trailer.

However, the effects achievable through the disclosure are not limited to the above-mentioned effects, and other effects not mentioned herein will be clearly understood by those skilled in the art from the above description.

The method according to the embodiment described above may be programmed to be executed in a computer and may be stored on a computer-readable recording medium. Examples of the computer-readable recording medium may include ROM, RAM, a CD-ROM, a magnetic tape, a floppy disk, and an optical data storage device. The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the present disclosure pertains.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A rear wheel steering (RWS) control method for a cargo trailer, the RWS control method comprising:
   determining a driving mode of a vehicle connected to the cargo trailer;
   executing a RWS control logic of the cargo trailer based on the driving mode and an input signal from the vehicle, a length of a tow bar, a cosine of an angle between the tow bar and a connecting shaft, a length of a coupler and a cosine of an angle between the coupler and the connecting shaft corresponding to the driving mode; and
   performing RWS control for the cargo trailer based on the RWS control logic.

2. The RWS control method according to claim 1, wherein the determining the driving mode of a vehicle comprises:
   determining, based on the input signal, one of a low-speed forward turning mode, a high-speed forward turning mode, and a reverse turning mode of the vehicle.

3. The RWS control method according to claim 2, wherein the executing the RWS control logic of the cargo trailer comprises:
   controlling a RWS angle of the cargo trailer based on a steering angle of the vehicle; and
   performing in-phase control or reverse-phase control on a wheel of the cargo trailer based on the RWS angle.

4. The RWS control method according to claim 3, wherein the controlling the RWS angle of the cargo trailer based on a steering angle of the vehicle comprises:
   when an absolute value of a product of the length of the tow bar and the cosine of the angle between the tow bar and the connecting shaft exceeds an absolute value of a product of the length of the coupler and the cosine of the angle between the coupler and the connecting shaft, reducing the RWS angle of the cargo trailer.

5. The RWS control method according to claim 4, wherein the controlling the RWS angle of the cargo trailer based on a steering angle of the vehicle comprises:
   when the vehicle is in the low-speed forward turning mode or in the high-speed forward turning mode, controlling the RWS angle of the cargo trailer based on a travel time difference due to a distance between the vehicle and the cargo trailer according to a vehicle speed, the length of the coupler, the length of the tow bar, the angle between the coupler and the connecting shaft, and the angle between the tow bar and the connecting shaft.

6. The RWS control method according to claim 5, wherein performing in-phase control or reverse-phase control on a wheel of the cargo trailer comprises:
   when the vehicle is in the low-speed forward turning mode, performing reverse-phase correction control on the wheel of the cargo trailer based on the controlled RWS angle in a direction opposite a direction in which the vehicle is turned.

7. The RWS control method according to claim 5, wherein performing in-phase control or reverse-phase control on a wheel of the cargo trailer comprises:
   when the vehicle is in the high-speed forward turning mode, performing in-phase correction control on the wheel of the cargo trailer based on the controlled RWS angle in a same direction as a direction in which the vehicle is turned.

8. The RWS control method according to claim 4, wherein the controlling the RWS angle of the cargo trailer based on a steering angle of the vehicle comprises:
   when the vehicle is in the reverse turning mode, calculating an extent of alignment between the vehicle and the cargo trailer based on the length of the coupler, the length of the tow bar, the angle between the coupler and the connecting shaft, and the angle between the tow bar and the connecting shaft.

9. The RWS control method according to claim 8, further comprising:
   correcting, based on the extent of alignment, an amount by which the cargo trailer is turned about the connecting shaft in a direction opposite a direction in which the vehicle is turned.

10. The RWS control method according to claim 1, further comprising:
    upon sudden steering of the vehicle, performing control such that a pinion angle generated by a steering wheel of the vehicle increases.

11. A rear wheel steering (RWS) control system for a cargo trailer, the RWS control system comprising:
    a RWS controller including a motor, a lead screw, and electronic control unit configured to determine a driving mode of a vehicle connected to the cargo trailer and execute a RWS control logic of the cargo trailer based on the driving mode and an input signal from the vehicle, a length of a tow bar, a cosine of an angle between the tow bar and a connecting shaft, a length of a coupler and a cosine of an angle between the coupler and the connecting shaft corresponding to the driving mode; and a RWS device configured to perform RWS control for the cargo trailer based on the RWS control logic.

12. The RWS control system according to claim 11, wherein the RWS controller determines, based on the input signal, one of a low-speed forward turning mode, a high-speed forward turning mode, and a reverse turning mode of the vehicle.

13. The RWS control system according to claim 12, wherein the RWS controller controls a RWS angle of the cargo trailer based on a steering angle of the vehicle, and performs in-phase control or reverse-phase control on a wheel of the cargo trailer based on the RWS angle.

14. The RWS control system according to claim 13, wherein, when an absolute value of a product of the length of the tow bar and the cosine of the angle between the tow bar and the connecting shaft exceeds an absolute value of a product of the length of the coupler and the cosine of the angle between the coupler and the connecting shaft, the RWS controller reduces the RWS angle of the cargo trailer.

15. The RWS control system according to claim 14, wherein, when the vehicle is in the low-speed forward turning mode or in the high-speed forward turning mode, the RWS controller controls the RWS angle of the cargo trailer based on a travel time difference due to a distance between the vehicle and the cargo trailer according to a vehicle speed, the length of the coupler, the length of the tow bar, the angle between the coupler and the connecting shaft, and the angle between the tow bar and the connecting shaft.

16. The RWS control system according to claim 15, wherein, when the vehicle is in the low-speed forward turning mode, the RWS controller performs reverse-phase correction control on the wheel of the cargo trailer based on the controlled RWS angle in a direction opposite a direction in which the vehicle is turned.

17. The RWS control system according to claim 15, wherein, when the vehicle is in the high-speed forward turning mode, the RWS controller performs in-phase correction control on the wheel of the cargo trailer based on the controlled RWS angle in a same direction as a direction in which the vehicle is turned.

18. The RWS control system according to claim 14, wherein, when the vehicle is in the reverse turning mode, the RWS controller calculates an extent of alignment between the vehicle and the cargo trailer based on the length of the coupler, the length of the tow bar, the angle between the coupler and the connecting shaft, and the angle between the tow bar and the connecting shaft.

19. The RWS control system according to claim 18, wherein, based on the extent of alignment, the RWS controller corrects an amount by which the cargo trailer is turned about the connecting shaft in a direction opposite a direction in which the vehicle is turned.

20. The RWS control system according to claim 11, wherein, upon sudden steering of the vehicle, the RWS controller performs control such that a pinion angle generated by a steering wheel of the vehicle increases.

* * * * *